W. E. VER PLANCK.
SYSTEM OF ELECTRICAL DISTRIBUTION.
APPLICATION FILED JULY 2, 1908.

1,010,466.

Patented Dec. 5, 1911.
6 SHEETS—SHEET 4.

Witnesses:
Marcus L. Byng.
J. Ellis Glim

Inventor:
William E. Ver Planck,
by
Atty.

Fig. 8.

UNITED STATES PATENT OFFICE.

WILLIAM E. VER PLANCK, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

1,010,466.  Specification of Letters Patent.  Patented Dec. 5, 1911.

Application filed July 2, 1908. Serial No. 441,687.

*To all whom it may concern:*

Be it known that I, WILLIAM E. VER PLANCK, a citizen of the United States, residing at Schenectady, in the county of Schenectady, State of New York, have invented certain new and useful Improvements in Systems of Electrical Distribution, of which the following is a specification.

My invention relates to systems of electrical distributions, and particularly to systems of electric lighting for railway trains.

In the particular embodiment of my invention, hereinafter described, a system of train lighting is provided in which a generator furnishes current at substantially constant voltage to train lines which extend throughout the train, and across which the lamps in the various cars are connected, storage batteries being provided on one or more cars of the train to furnish current to the train lines and lamps when necessary. Means is provided, in connection with each storage battery, for charging the latter from the train lines and for causing the battery to supply current to said train lines at substantially the normal voltage of the latter when for any reason the generator becomes unavailable as a source of supply, or is unable, due to overload, to keep the voltage of the train lines up to normal. In my system, therefore, the generator and the storage battery are each connected to the train lines and operate together to maintain the voltage of the latter substantially constant and the battery is charged from these same train lines while they are furnishing current to the lamps.

In the particular embodiment hereinafter set forth a booster is arranged in series with the battery and is suitably controlled to regulate the charging and discharging of the latter. Means are also provided for accomplishing other desired objects, hereinafter more explicitly referred to, to the general end that the system as a whole shall be altogether automatic in its operation under the various conditions which occur in practice.

Referring to the drawings.

Like parts are referred to throughout the several views by the same reference characters.

Figure 2:
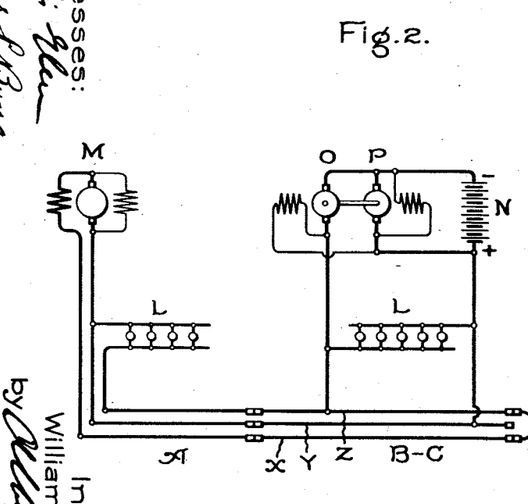
Fig. 2 is a simplified diagrammatic view of the system shown in Fig. 1.

In Fig. 2 I have shown my system of distribution in a simplified form, the regulating devices being omitted. In this figure at A, is shown the generator equipment mounted upon the locomotive or baggage car, M being the generator which may be driven by a small steam turbine or engine, preferably the former. At B—C is indicated the equipment upon a car provided with a storage battery. The storage battery is indicated at N and a booster O is shown connected in series with the battery and driven by a motor P. Lamps L both on the locomotive and on the car are connected to train wires Y and Z, to which are also connected the battery and booster. A third train wire X leads from one terminal of the generator through the train and is connected at the rear end of the train wire Z, as shown in the drawing. By using three wires in this way the drop in the train line between the generator and each car of the train is practically the same for each car as will be obvious to those skilled in this art, this expedient being well known. In the systems of distribution made the subject of this application, the generator M, when operating and connected to the car B—C, supplies current to the lamps and charges the battery N through the booster O. If the generator M is disconnected from the car equipment B—C, the lamps on this car are supplied from the storage battery N through the booster O. Suitable means, hereinafter fully described, are provided for automatically connecting the generator M to and disconnecting it from the train lines, for maintaining constant the voltage supplied by the generator, for automatically starting and stopping the booster O and for regulating the voltage of the booster so as to cause it to control the voltage applied to the battery in charging and to control the voltage applied to the lamps when the same are being furnished with current from the battery.

Figure 1:
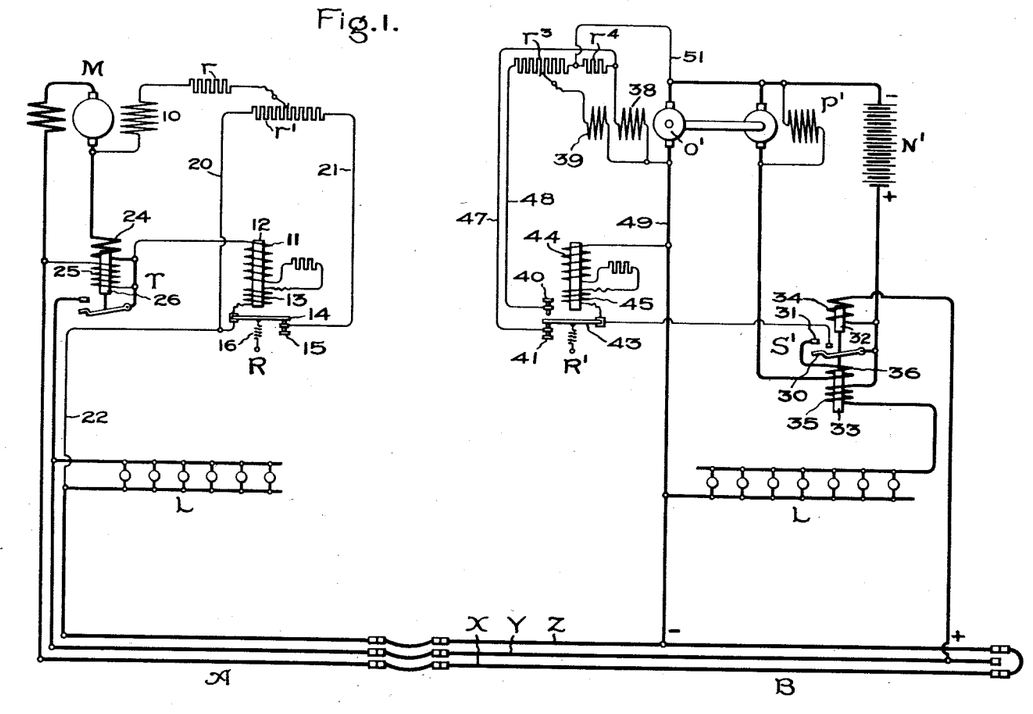
Figure 1 illustrates diagrammatically the generator equipment which may be installed on a locomotive or baggage car, as may be found most convenient or desirable, and shows also the equipment for a car having a storage battery thereon for supplying the lights when the generator is disconnected.
Figure 4:
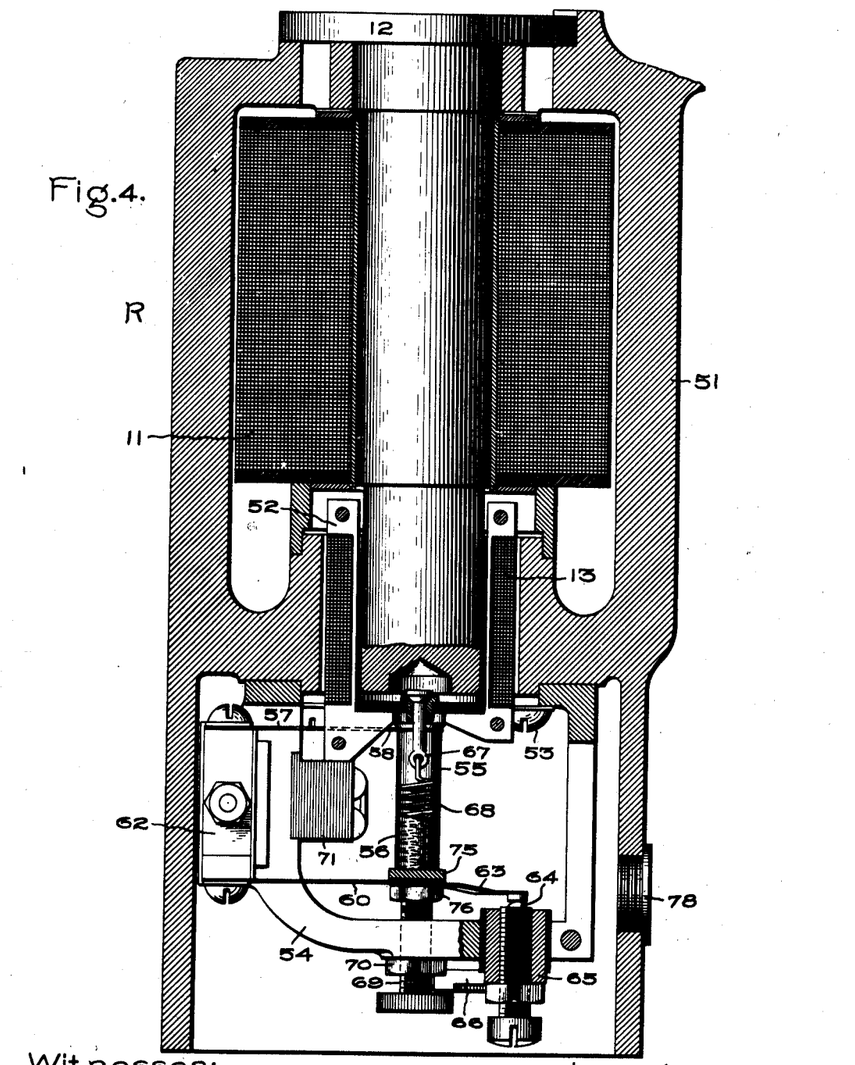
Fig. 4 is an elevation, partly in section, of the voltage regulator for the generator.
Figure 5:
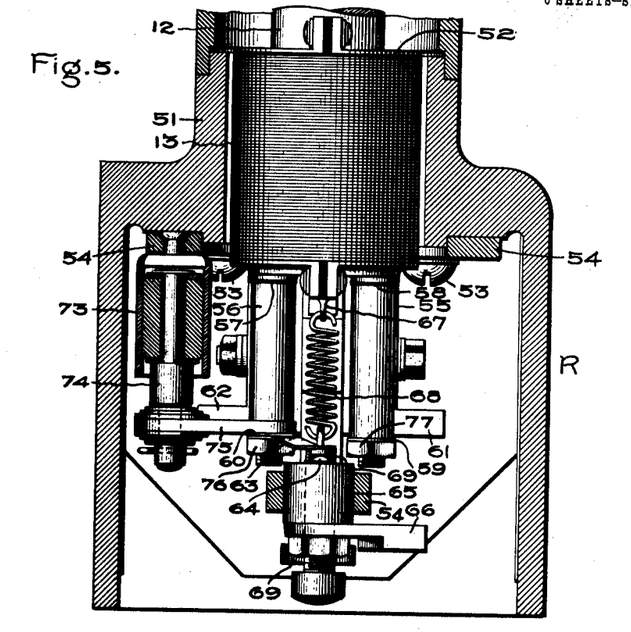
Fig. 5 is an elevation, partly in section of the lower portion of the regulator shown in Fig. 4, this view being taken at right angles to that of Fig. 4.
Figures 6, 7:
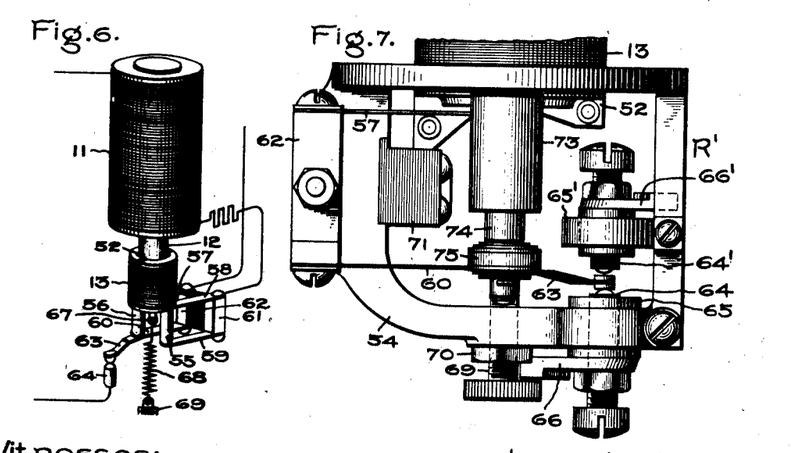
Fig. 6 is a perspective elevation in somewhat diagrammatic form of the principal elements of the voltage regulator shown in Figs. 4 and 5.
Fig. 7 is an elevation of the lower portion of the voltage regulator, similar to that of Fig. 4, used in the car equipment illustrated in Fig. 1.

Referring to Fig. 1, the generator equipment is shown at A and the equipment for a car provided with a storage battery is indicated at B. The generator M is preferably compound wound and its voltage is maintained constant in any suitable manner, as by means of a voltage regulator R. This voltage regulator, the construction of which is shown in Figs. 4, 5 and 6 and is hereinafter described, coöperates with the shunt field 10, and by intermittently closing and opening a circuit through which current is supplied to this field varies the field strength of the generator and maintains the voltage at which it furnishes current to the lamps substantially constant. This voltage regulator R, hereinafter described in detail, comprises a fixed coil 11 surrounding an iron core 12 about the lower end of which is a coil 13, capable of movement upon said core, a contact member 14 being attached to the coil 13 and arranged to move with it so as to make and break contact with a fixed contact member 15. The movable parts of the regulator are biased to bring the contact member 14 into engagement with the fixed contact 15, by means of a spring 16, the tension of which may be adjusted in any suitable manner. Fig. 6 makes the arrangement of these parts clear. The circuit through the shunt field coil 10 is through a resistance $r$, to an adjustable point on the resistance $r^1$, and through this resistance in parallel paths 20 and 21, the latter of which leads through the contacts of the voltage regulator R, both of the wires 20 and 21 being connected to the train wire Z through the wire 22 in a manner clear from the diagram. The voltage of the generator rises and falls to compensate for drop in potential in the train wires.

In order to make the current handled by the contact of the voltage regulator R as small as possible, the series coil of the generator is designed to take care, as closely as possible, of the average line drop under average conditions as to number of cars and load per car. The circuit through the wire 20 to the shunt field furnishes sufficient current to the shunt field to take care of the lowest voltage required of the generator, and the circuits 20 and 21 in parallel furnish sufficient current to the shunt field to take care of the highest voltage required. The resistances $r$ and $r^1$ are so proportioned that the regulator R just takes care of variations above and below the average line drop by controlling the voltage of the generator so as to compensate for it.

The variations in line drop referred to are due to changes in temperature of the shunt field winding, slight variations in the speed of the turbine or engine which drives the generator, and changes in proportion between the train load and the train line resistance. During operation the movable contact member 14 constantly vibrates making and breaking the circuit through the wire 21. In this way the voltage supplied to the lamps by the train line is maintained substantially constant.

At T is indicated a reverse current relay of any suitable form which automatically closes when the generator is started and opens when the steam turbine or engine which drives the generator is shut down. This relay T comprises a series coil 24 and a shunt coil 25 which are so wound that when current is being furnished to the line by the generator M the fields produced by these coils will be in the same direction and will act together upon a movable core 26 to which is connected the movable contact of the relay. The relay is closed by the energization of the shunt coil 25 and is held closed by that coil and the series coil 24 which is then energized. When the steam turbine or engine is shut down, if the generator is connected to the battery or batteries through the train lines, the current through the coil 25 will continue in the same direction, but that through the coil 24 will reverse and the field produced by it will oppose that produced by the coil 25, thereby reducing the resultant field and allowing the relay to open.

In the car equipment illustrated at B in Fig. 1, the storage battery $N^1$ has such a number of cells that its normal open circuit voltage is approximately equal to that at which it is desired to operate the lamps. The armature of the booster $O^1$ is connected in series with the storage battery $N^1$ and the two are connected permanently across the train wires Y and Z in parallel to the lamps. The motor $P^1$ which drives the booster is shunt wound and is arranged to be connected across the terminals of the battery by the booster starting relay $S^1$. This relay $S^1$, shown more in detail in Fig. 8 and hereinafter more fully described, comprises a movable contact member 30 which coöperates with the fixed contact 31, said movable contact member being connected to magnetic cores 32 and 33 which move respectively in the field produced by the coil 34 connected in the circuit leading from one terminal of the battery to the train wire Y and in the field produced by the coil 35 connected in the circuit from one terminal of the battery to the lamps. A third coil 36 of few turns is applied to the core 33, being energized by the comparatively large starting current of the motor $P^1$ and serving simply to insure complete closing of the contacts 30 and 31. The coil 36 has practically no holding effect after the relay $S^1$ has closed owing to its few turns and the small current which passes through it after the motor $P^{1'}$ has come up to speed. The booster $O^1$ is provided with differently wound fields 38 and 39 the current through which is controlled by the magnetically operated switch device or voltage regulator $R^1$.

The regulator $R^1$ is very similar to the regulator R used in connection with the generator M, the only difference of construction being that the regulator R has but a single fixed contact, while the regulator $R^1$ has an upper fixed contact 40 as well as a lower fixed contact 41 with both of which the movable contact member 43 coöperates. The operating coils 44 and 45 of this regulator are connected in series across the lamps through auxiliary contacts on the starting relay $S^1$ closed when this relay is closed. Current for the differential fields 38 and 39 also is derived through these auxiliary contacts on the relay $S^1$. The field coils 38 and 39 are differential in the sense that they produce different polarity of the booster according as one or the other of said coils is connected across the lamp circuit through the contacts of the regulator $R^1$. The fixed contact 41 of the regulator $R^1$ is connected through a wire 47 to one terminal of the field coil 38 and the contact 40 is connected through a wire 48 and a variable resistance $r^3$ to one terminal of the field coil 39, the other terminals of these field coils being connected to the wire 49 which connects one terminal of the booster armature with the train wire Z. The field coil 38 is permanently connected in shunt to the booster armature through a wire 51 and a resistance $r^4$, and the field coil 39 is connected in a similar manner in shunt to the armature of the booster through a portion of the resistance $r^3$. With this arrangement sparking between the contact 43 and the contacts 40 and 41, due to the self induction of the field coils, is prevented since the current which the field 38 derives from being connected in shunt to the booster armature is always in the right direction and sufficient to keep the field produced by the coils 38 and 39 from dying down too rapidly. The resistances $r^3$ and $r^4$ are sufficiently large to prevent any great amount of wasteful current from passing through them from one terminal of the battery to the other through the contacts of the regulator $R^1$ and the auxiliary contacts of the relay $S^1$. The resistances $r^3$ and $r^4$ also render insignificant the excitation of the field coils 38 and 39, due to their being connected in shunt to the booster armature. When the movable contact of the regulator $R^1$ is in engagement with the fixed contact 41 and the field coil 38 is, therefore, receiving current, the polarity and voltage of the booster are such that the voltage furnished by the battery is raised, and when the movable contact of the regulator is in engagement with the upper fixed contact 40 the field 39 is energized at a higher value than before and the polarity and voltage of the booster are such that the voltage of the battery is decreased, thereby permitting the battery to be charged from the train lines Y and Z. The point at which the field coil 39 should be connected to the resistance $r^3$ depends upon the voltage at which it is desired to charge the battery. The operation of the booster under the control of the regulator $R^1$ will be fully hereinafter described.

The mechanical construction of the voltage regulator R will be apparent from Figs. 4, 5 and 6. The fixed coil 11 is supported in an iron frame 51 of any suitable design and an iron core 12 is supported from the top of the frame and extends downwardly through the coil 11 as is clear from Fig. 4. The floating coil 13 which surrounds the lower end of the core 12 is wound upon a supporting shell 52 preferably of aluminum and which, if desired, may be made in two parts secured together, but insulated from one another in order that the ends of the coil 13 may be connected one to each half of the shell, thereby allowing electrical connection with the coil 13 to be easily made. Secured to the frame 51 by screws 53 is a frame 54 upon which are supported the contacts of the regulator and all the movable parts. The shell 52 upon which the coil 13 is supported has projecting from the bottom of each of its halves metallic rods 55 and 56, to the upper and lower ends of which are secured the flexible strips of conducting material 57, 58, 59 and 60, the other ends of these strips being connected to terminals 61 and 62 secured to the frame 54 and insulated therefrom. Secured to the bottom of the rod 56 is a flexible contact finger 63, which extends into coöperative relation with the fixed contact 64, consisting of an adjustable screw located in a bushing 65 mounted in and insulated from the frame 54. A terminal 66 provides for electrical connection with the contact screw 64. Projecting from the bottom of the shell 52 and insulated therefrom is an eye 67 to which is secured one end of a spring 68, the tension of which can be regulated by means of the screw 69 to which the other end of the spring is secured, a lock nut 70 being provided to insure the screw 69 remaining in any position to which it may be adjusted. A block 71 of insulating material secured to the frame 54 serves as a stop for the shell 52 in its downward movement under the influence of the spring 68. A valveless dash pot 73 is secured to the under side of the top ring of the frame 54, as shown in Fig. 5, its plunger 74 being connected to the arm 75 which projects outwardly from the bottom of the rod 56 and is secured rigidly to said rod.

It will be understood that the arm 75, the strip of conducting material 60 and the flexible contact finger 63 may all be clamped together against the shoulder on the end of the rod 56 by means of a nut 76 and that on the end of the rod 55 a nut 77 serves in a similar manner to clamp the flexible strip 59 to the rod. Between the arm 75 and the plunger 74 of the dash pot there is a slight amount of lost motion as is shown in Fig. 5. A hole in the lower part of the frame 51 filled by the plug 78 permits easy access to the contacts for the purpose of inspection.

From the construction of the regulator it will be clear that the coil 13 is located in a strong field produced by the coil 11 and that if the fields produced by the coils 11 and 13 are in the same direction the coil 13 will tend to move upward and carry with it the contact finger 63. The tendency of the floating coil 13 to move in an upward direction is opposed by the spring 68 and by adjusting the tension of this spring by means of the screw 69 the voltage at which the contacts will open may be regulated. During normal operation the contact finger 63 of the regulator is vibrating constantly making and breaking connection with the fixed contact 64. The lost motion between the arm 75 and the piston 74 of the dash pot permits free motion of the floating coil sufficiently to allow opening and closing of the contacts, but the dash pot will effectively prevent any sudden large movement of the floating coil and acts as a damping device to keep the movement of the contact finger within narrow limits.

Fig. 7 shows the modifications necessary in the regulator of Figs. 4 and 5 to adapt it for use as the booster regulator $R^1$ of Fig. 1. It will be clear from Fig. 7, which is a side elevation similar to Fig. 4 of the lower part of the regulator, that the only change is the addition of an upper fixed contact $64^1$ which consists of a screw similar to the screw 64 serving as the lower contact. The screw $64^1$ is mounted in a bracket $65^1$ secured to but insulated from the frame 54 and a terminal $66^1$ makes electrical connection with the terminal $64^1$.

Figure 8:
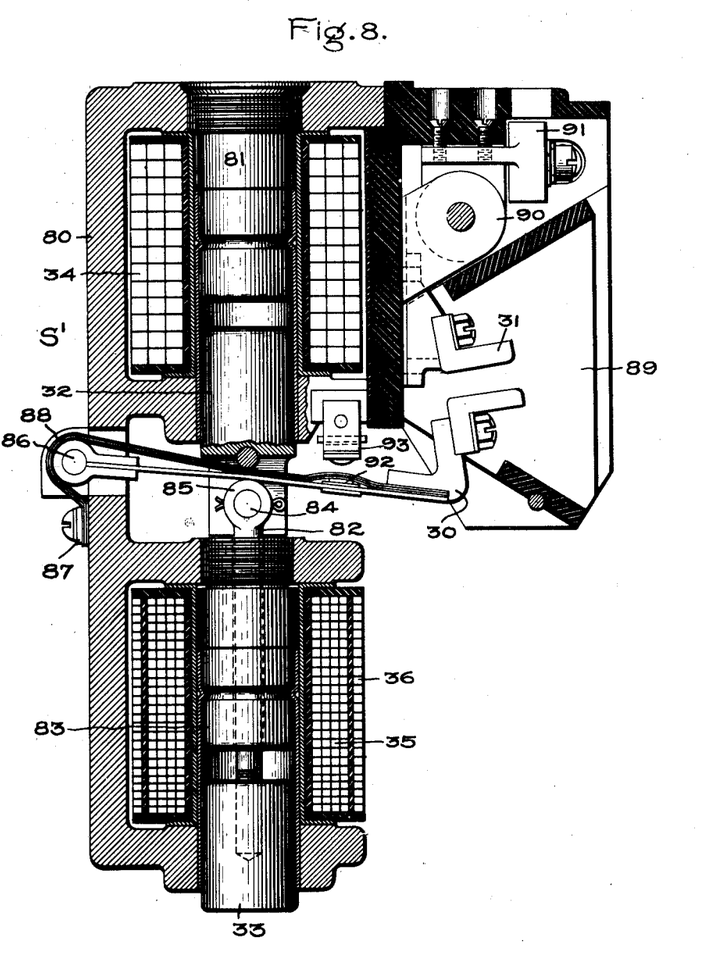
Fig. 8 is a sectional elevation of the booster starting relay shown in the car equipment illustrated in Fig. 1.

The booster starting relay $S^1$ of the system of Fig. 1 is shown in cross section in Fig. 8. The frame of the relay, which may be of any suitable form, is shown in cross section at 80 and mounted in it are the coils 34, 35 and 36 arranged as shown. The upper movable core 32 moves in the field of the coil 34 and in its upward movement approaches a fixed core 81 which projects downwardly from the frame 80 into the coil 34. The lower movable core 33 has secured to it a rod 82 which extends upward through a hole in the fixed core 83 secured in the frame 80, as shown, the rod 82 being secured to the bottom of the core 32 by a pin 84 which extends through an eye 85 in the end of the rod 82. The movable contact member 30 of the relay is pivoted in the frame 80 at 86, and in order to insure good electrical connection between the contact and the terminal 87, a conductor 88 composed of thin strips of copper may be employed in a well-known manner. The fixed contact 31 is shown arranged in coöperative relation to the contact 30 and both contacts are located in an arc chute 89 of well-known form which is provided with a blowout coil 90 in a suitable and well-known manner. Connection to the fixed contact 31 through the blow-out coil 90 may be made at the terminal 91. The auxiliary contacts on the relay $S^1$, shown in Fig. 1, are indicated in Fig. 8 at 92 and 93, the first being mounted upon the movable contact member 30, while the other is fixed upon the frame in any suitable manner.

It will be obvious that the mechanical construction of the relay $S^1$ may be modified in many ways, and since its particular design forms no part of my invention, I do not deem it necessary to more fully describe it in this application.

The operation of the system shown in Fig. 1 is as follows: Let us first assume that the car B is standing alone disconnected from the locomotive equipment. In this system, as has been stated, the open circuit voltage for the battery is approximately equal to that at which it is desired to operate the lamps; for example, 110 volts. The lamps may be designed for operation on from 110 to 115 volts. The booster regulator $R^1$ is set to maintain the voltage of the lamps at 111 to 112 volts when the lamps are being furnished with current by the battery. As shown in the diagram, the lamps are supposed to be all extinguished and the booster at rest. As lamps are turned on in the car, the current passing from the positive side of the battery through the coil 35, through the lamps and through the stationary booster $O^1$ increases until the magnetic effect of the coil 35 is sufficient to close the booster starting relay $S^1$. As soon as this relay is closed the booster starts up and the voltage regulator $R^1$ is thrown into operation by the closing of the auxiliary contacts on the relay $S^1$. The booster, under the control of the voltage regulator, maintains the voltage at the lamps at 111 to 112 volts irrespective of the voltage at the terminals of the battery. During this operation the movable contact of the regulator $R^1$ is constantly vibrating making and breaking connection with one of the fixed contacts 40 or 41, depending on whether the voltage of the battery is above or below the voltage desired at the lamps. If at any time enough of the lamps are extinguished to reduce the current in the coil 35 below the value required to hold the relay $S^1$ closed, the relay opens, thereby stopping the booster and throwing the regulator $R^1$ out of operation.

Let us now suppose that a car having the equipment illustrated at B in Fig. 1 is connected to another car or cars upon which there are lamps but no battery or other lighting equipment. As will be obvious from the drawing, the current flowing from the battery of the equipment B through the train line to the other cars must all pass through the coil 34 on the relay $S^1$. When, therefore, the current in the coil 34 rises to a certain value, owing to the turning on of lamps on the other car or cars, the relay $S^1$ will close, thereby starting the booster as before and throwing the voltage regulator $R^1$ into action. It is obvious that coils 34 and 35 might work together to attain the same result. The battery $N^1$ will, with the aid of the booster, continue to furnish current to the train wires Y and Z at a constant voltage of 111 or 112 volts as long as the capacity of the battery will allow.

Let us now assume that the car equipment B, of Fig. 1, with its booster at rest is connected to a generator equipment such as A, the voltage regulator R being set to maintain the voltage between train wires Y and Z at about 114 or 115 volts. As soon as the steam turbine or engine which drives the generator has come up to speed, the reverse current relay T closes and connects the generator to the train lines. When it is remembered that the open circuit voltage of the battery is approximately 111 to 112 volts, it is evident that the application of 114 to 115 volts to the train line will cause a flow of current through the battery and the booster armature from the train lines. This current must pass through the coil 34 and is sufficient to close the relay $S^1$. Closing of the relay $S^1$ starts the booster set and connects the coils 44 and 45 of the regulator $R^1$ across the train lines. Since the regulator $R^1$ is set for 111 to 112 volts the application of the higher voltage of the train line results in lifting the movable contact member 43 of the regulator $R^1$ into engagement with the fixed contact 40, thereby nearly wiping out the excitation produced by the coil 38 and increasing the excitation produced by the coil 39. As has been stated above, the field coils 38 and 39 are differentially wound, so that when the movable contact of the regulator $R^1$ is in its upper position the polarity of the booster is reversed from what it is when the movable contact is in its lower position. Under this condition the voltage of the train line is raised by the booster to perhaps 130 to 140 volts, and the battery is charged at this voltage, while at the same time, if lamps are turned on, they will be fed directly from the train line at 114 or 115 volts. If there are no lamps burning on the car B the charging of the battery will continue until the voltage of the battery increases sufficiently to cut down the current flowing to it through the coil 34, below the value necessary in that coil to maintain the relay $S^1$ closed. As soon as this occurs the relay opens, the booster stops and the battery remains charged and connected to the train lines. If, however, enough lamps are burning on the car B to keep the relay $S^1$ closed by the energization of its coil 35, the booster will continue to operate and the charging current through the battery will taper off to a very small value. If it should happen that, owing to low steam pressure or excessive load on the generator, the latter is unable to maintain the voltage on the train line at the normal value of 114 to 115 volts, the movable contact of the regulator $R^1$ will no longer be held in engagement with the upper fixed contact 40, but will vibrate on the latter, thereby reducing the voltage of the booster and decreasing the battery current a sufficient amount to relieve the overload on the generator. If after this decrease in the charging current the generator is still unable to keep up the voltage on the train line, it is evident that the movable contact member of the regulator $R^1$ will engage the lower fixed contact and vibrate thereon, thereby causing the battery to discharge to the train line and assist the generator, to any extent within the capacity of the battery, to maintain the desired voltage (111 to 112 volts) at the lamps. It is evident that this same action occurs when the generator is shut down or the train line circuit interrupted. The reason for arranging the coils 34 and 35 on different cores will now be apparent. While current through the coil 35 is always in the same direction, that through coil 34 may be in either direction depending upon whether the battery is receiving current from or furnishing current to the train line, and if the coils 34 and 35 were arranged on the same core they would under certain conditions buck one another. Since the current through coil 36 is always in the same direction, this coil is wound on the same core as coil 35 and is so wound as to produce the same polarity.

If the car B of Fig. 1, while its relay $S^1$ is open, is connected to train wires to which a similar equipment is supplying current at 111 or 112 volts, the relay $S^1$ will not close and the battery on that car be charged from the battery on the other car, since under this condition the difference in voltage between the train wire and battery will produce a current in the coil 34 insufficient to operate the relay. With this equipment, therefore, there is no danger of the battery on one car being charged from the battery on another.

Figure 9:
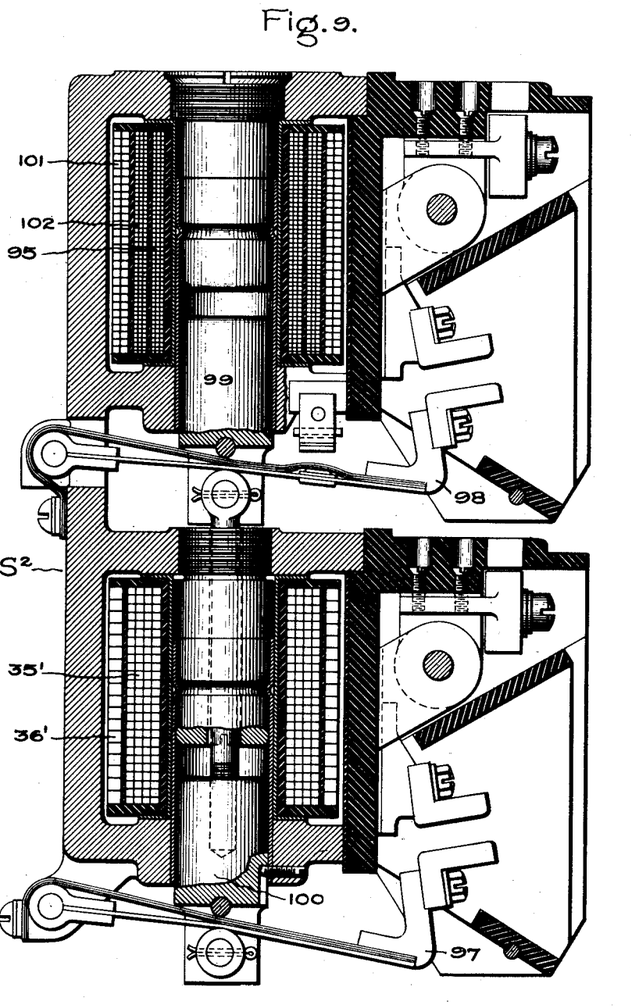
Fig. 9 is a sectional elevation of the booster starting relay shown in the car equipment illustrated in Fig. 3.

In the system illustrated in Fig. 3 the number of cells in the battery $N^2$ is such that its normal open circuit voltage is considerably below that at which it is desired to operate the lamps. When the battery is furnishing current either to the lamps on the same car or to the train line, the booster $O^2$ serves to raise the voltage to the desired value, and when the battery is being charged the booster serves to control the charging current in a manner hereinafter explained. In this system as in that of Fig. 1 the booster is driven by a shunt motor $P^2$ which is connected across the terminals of the battery when the starting relay $S^2$ is closed. The booster $O^2$ is provided with a single field $38'$, the current in which is controlled by the voltage regulator $R^2$, similar in construction to the regulators $R$ and $R^1$ hereinbefore described. The field coil $38'$ is permanently connected in shunt to the armature of the booster $O^2$ through a resistance $r^6$ in order to reduce sparking at the contacts of the regulator $R^2$ in the same manner as in the system of Fig. 1. The coils $44'$ and $45'$ of the voltage regulator $R^2$ are connected across the lamps through a coil 95 on the starting relay $S^2$ short circuited through auxiliary contacts when the relay is closed. The regulator $R^2$ is also provided with a heavy coil 96 of few turns, which is arranged in the circuit through which current passes in going to and coming from the train line and is so wound that the field produced by it, when current is entering the car, bucks that of the coils $44'$ and $45'$. The purpose of this coil 96 is hereinafter explained. The starting relay $S^2$, the construction of which is shown in Fig. 9 and more fully hereinafter described, comprises two movable contact members 97 and 98 connected together and arranged to be operated by either or both of the cores 99 or 100. The core 99 is acted upon by the coil 101 arranged in series with the booster armature, and the coil 102 connected in shunt to the upper relay contacts through a resistance $r^7$, which coils, as will be hereinafter explained, always produce magnetic fields having the same direction, although the direction of current in these coils is under some conditions reversed. The core 99 is also acted upon by the field produced by the coil 95 before referred to. The coil 102 is permanently connected between the positive train wire Y and the positive side of the battery, and the voltage impressed upon it and the resistance $r^7$ in series is, therefore, the difference between the voltage of the train line and the voltage of the battery. The core 100 is acted upon by the field produced by a coil $35'$ and a coil $36'$ connected, respectively, in series with the lamps and in series with the motor $P^2$. As in the case of the relay $S^1$ of the system of Fig. 1, the coil $36'$ serves simply to insure the contacts of the relay coming hard together in closing, and after the motor $P^2$ is up to speed has practically no holding effect.

Figure 3:
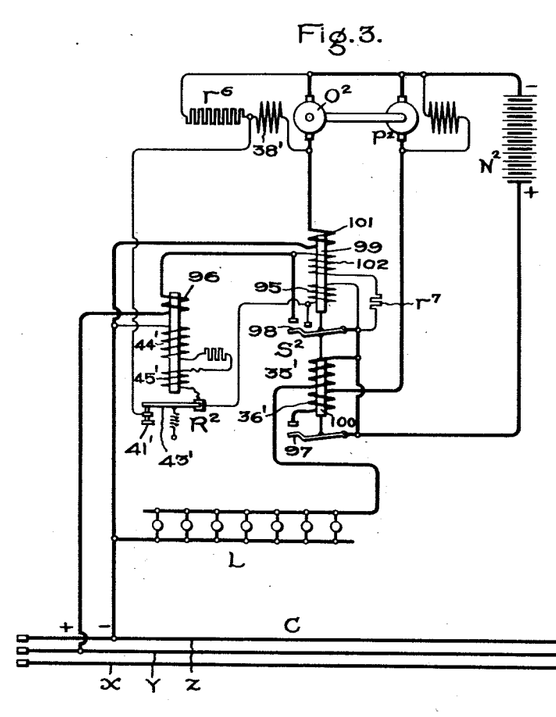
Fig. 3 is a diagrammatic view of a modified form of car equipment, similar in many respects to that shown in Fig. 1.

The booster starting relay $S^2$ in the system of Fig. 3 is shown as to its details of construction in Fig. 9. As shown this relay is the same in construction as the relay $S^1$ illustrated in Fig. 8, except that it is provided with two movable contact members instead of one and a different number and size of coils. The coils 101, 102 and 95 are shown coöperating with the upper movable core 99, while the coils $35'$ and $36'$ are arranged in coöperative relation to the lower core 100. Since the particular design of this relay forms no part of my invention, and since the similar relay $S^1$ has been above described, further description is believed to be unnecessary.

The mode of operation of the system illustrated in Fig. 3 is as follows: We will first assume that the equipment shown in Fig. 3 is disconnected from the locomotive and is operating as an independent unit. In order to make the operation more clear, we will suppose that the normal open circuit voltage of the battery $N^2$ is 90 volts and that the regulator $R^2$ is set to maintain the voltage furnished the lamps through the booster at about 110 volts. When enough of the lamps L have been turned on to raise the current in the coil $35'$ of the relay $S^2$ to a certain value, this relay will close and in closing will connect the motor $P^2$ across the terminals of the battery and will put the booster in operation. The first rush of current through the coil $36'$ will insure satisfactory closing of the contacts of the relay. The closing of the relay may be slightly assisted by the energization of the coils 95 and 101. After the relay has closed, the coil 101 may aid the coil $35'$ to some extent in holding it closed. The regulator $R^2$ so controls the field of the booster that the voltage at the lamps will be maintained at 110 volts during discharge of the battery in a manner similar to that in which the regulator $R^1$ controls the voltage in the system of Fig. 1. If at any time enough of the lamps are extinguished to reduce the current in the coils 35' and 101 below the value required to hold the relay $S^2$ closed, the relay will open thereby stopping the booster.

Let us now assume that the equipment of Fig. 3 is connected to a generator equipment, such as that illustrated at A in Fig. 1, which supplies current at 115 volts. Under this condition a difference of potential will be applied to the coil 102 and its resistance $r^7$ equal to the difference between the voltage of the generator and the voltage of the battery, or approximately 25 volts. The resultant energization of the coil 102 taken with the energization of the coil 95, which is connected across the terminals of the battery through the coils 44', 45', 101 and the armature of the booster $O^2$ and which produces a field in the same direction as that produced by the coil 102, will cause the relay $S^2$ to close thereby connecting the train wires Y and Z to the terminals of the battery through the booster and the coils 96 and 101 on the regulator $R^2$ and the relay $S^2$ respectively. Closing of the relay $S^2$ short-circuits the coils 102 and 95 and the relay is held closed by current through the coil 101. Since the voltage applied to the coils 44' and 45' of the regulator $R^2$ is now 115 volts, which is a few volts higher than that for which the regulator is set, the movable contact 43' of the regulator is moved out of engagement with the fixed contact 41' and the field of the booster is weakened, thereby allowing the charging current to be applied to the battery at a potential approaching that of the train line or 115 volts. The coil 96 on the regulator $R^2$ is arranged, as stated above, to produce a field in opposition to that of the coils 44' and 45' and is so proportioned that if the current passing to the battery exceeds a certain value the movable contact 43' of the regulator will drop into engagement with the contact 41', thereby increasing the voltage of the booster and cutting down the current passing to the battery. In this way the booster $O^2$ under the control of the regulator $R^2$ will regulate the charging current for the battery. The coil 96 on the regulator $R^2$ will also be useful in preventing interchange of current between two car equipments connected to the same train line, since if the regulators $R^2$ on each car are not set for exactly the same value the coils 96 on these regulators will serve as equalizing coils and will tend to make the regulators on the different cars keep the voltage supplied by the cars at the same value.

Let us now suppose that the equipment of Fig. 3 is connected to a train line through which it is to supply current for lamps on a car or cars not provided with a storage battery or other source. Under this condition, the relay $S^2$ being open, current will flow from the positive end of the battery, through the resistance $r^7$, coil 102, coil 96 on the regulator $R^2$ to the train wire Y, thence through the lamps on the other car and back through the train wire Z and through the coil 101 and the booster armature to the negative terminal of the battery. The field produced by the coil 102 under this condition will oppose that produced by the coil 95, which is energized from the terminals of the battery as before, and the relay will not close until enough lamps have been turned on to raise the current in the coil 102 to a high enough value to overcome the field of the coil 95 by a considerable amount. The coil 101 under this condition will produce a field in the same direction as that produced by the coil 102 and will, therefore, assist the closing of the relay as well as maintain the same closed after operation. From this it will be apparent that the coil 95 serves simply to necessitate the current flowing from the battery rising to an amount high enough to sufficiently energize the coil 101 to render the same capable of holding the relay closed after it has operated, thereby removing all danger of "fluttering" of the relay. When the relay is closed the booster set starts up and the voltage supplied to the train wires is raised to 110 volts or perhaps a trifle lower, owing to the effect of the coil 96 on the regulator $R^2$ which now produces a field in the same direction as that produced by the coils 44' and 45'. Of course if lamps on the car C carrying the storage battery equipment are turned on, the relay $S^2$ will be assisted in its operation by the coil 35'.

Should it happen that the car C in Fig. 3 is connected, while its relay $S^2$ is open, to a similar equipment which is supplying current to the train wires at 110 volts, the relay $S^2$ will not be closed and the battery on that car charged from the battery on the other car since the voltage applied to the coil 102 and its resistance $r^7$ will be but 20 volts, instead of 25 volts as when the car C is connected to the generator supplying 115 volts, and the current in the coil 102 will be insufficient to cause the coil $S^2$ to close. Charging of a battery upon one car by a battery upon another car is, therefore, prevented. It is evident that in other respects the system of Fig. 3 will act in the same manner as that of Fig. 1.

While I have set forth in this application certain systems of distribution in which my invention may be embodied, I do not wish to be understood as limiting my invention to these particular arrangements since, as will be obvious to those skilled in the art, many details of the arrangement may be varied without departing from the spirit of the invention, as defined in the following claims.

What I claim as new and desire to secure by Letters Patent of the United States, is,—

1. In a system of electrical distribution, a secondary battery, translating devices connected thereto, means for maintaining substantially constant the voltage applied to said translating devices, and means for automatically throwing said first mentioned means into and out of operation according as the current taken by said translating devices is greater or less than a certain amount.

2. In a system of electrical distribution, a secondary battery, translating devices connected thereto, means including a booster connected in series with said battery for maintaining substantially constant the voltage applied to said translating devices, and means for automatically throwing said first named means into and out of operation according as the current taken by the translating devices is greater or less than a certain amount.

3. In a system of electrical distribution, a secondary battery, a booster arranged in series therewith, translating devices connected to said battery through said booster, means for automatically controlling the voltage of said booster to maintain substantially constant the voltage applied to said translating devices, and means for automatically starting and stopping said booster according as the current taken by said translating devices is greater or less than a certain amount.

4. In a system of electrical distribution, a secondary battery, translating devices connected thereto, a booster arranged in series with said battery, means for regulating the field strength of said booster so as to keep the voltage applied to said translating devices substantially constant, and means for automatically starting and stopping said booster according as the current taken by said translating devices is greater or less than a certain amount.

5. In a system of electrical distribution, translating devices, a source of current supply and a secondary battery connected in parallel to said translating devices, a booster arranged in series with said battery, means for automatically controlling the voltage of said booster to regulate the charging current passing to said battery from said source and to maintain substantially constant the voltage applied to said translating devices by said battery, and means for automatically starting and stopping said booster according as the current passing to said battery from said source is greater or less than a certain amount and according as the current taken by said translating devices is greater or less than a certain amount.

6. In a system of electrical distribution, translating devices, a source of current supply and a secondary battery connected in parallel to said translating devices, a booster arranged in series with said battery, differential fields on said booster, and a magnetically operated switch device for automatically controlling the energization of said fields to regulate the potential and polarity of said booster and maintain substantially constant the voltage applied to said translating devices by said battery and regulate the charging current to said battery.

7. In a system of electrical distribution, translating devices, a source of current supply and a secondary battery connected in parallel to said translating devices, a booster, connected in series with said battery, through which current passes in one direction in charging said battery and in the opposite direction when said battery is furnishing current to the translating devices, differential fields on said booster, means for automatically controlling the energization of said fields to regulate the voltage of said booster and maintain substantially constant the voltage applied to said translating devices by said battery and to permit charging of said battery through said booster, and means for automatically starting and stopping said booster according as the current taken by said translating devices is greater or less than a certain amount and according as the current passing to said battery from said source is greater or less than a certain amount.

8. In a system of electrical distribution, translating devices, a source of current supply and a secondary battery connected in parallel to said translating devices, a booster arranged in series with said battery, means for regulating the voltage of said booster to control the charging current passing to said battery and to maintain substantially constant the voltage applied to said translating devices by said battery, and a booster starting relay responsive to a certain value of current through said translating devices and a certain value of current to said battery from said source for automatically starting and stopping said booster and throwing said regulating means into and out of operation.

9. In a system of electrical distribution, translating devices, a source of current supply connected thereto, a secondary battery and a booster arranged in series therewith connected in parallel to said translating devices, means for automatically controlling the voltage of said booster to regulate the charging current passing to said battery from said source and to maintain substantially constant the voltage applied to said translating devices by said battery, and means for automatically starting and stopping said booster according as the current passing to said battery from said source is greater or less than a certain amount and according as the current taken by said translating devices is greater or less than a certain amount.

10. In a system of electrical distribution, translating devices, a source of current supply connected thereto, a secondary battery and a booster arranged in series therewith connected to said source in parallel with said translating devices, and means for automatically controlling the voltage of said booster to regulate the charging current passing to said battery from said source and to maintain substantially constant the voltage applied to said translating devices by said battery when connection between the source and said translating devices and battery is interrupted, and means for automatically starting and stopping said booster according as the current passing to said battery from said source is greater or less than a certain amount and according as the current taken by said translating devices from the source or from the battery is greater or less than a certain amount.

11. In a train lighting system, a generator furnishing approximately constant voltage, train lines connected to said generator and extending through the train, lamps on the various cars of the train connected across said train lines, and a storage battery system upon one or more cars of the train comprising a storage battery and a booster arranged in series and connected across said train lines, in parallel to the lamps, means for regulating the voltage of said booster to control the charging current passing to said battery from said train lines and to maintain substantially constant the voltage applied to said lamps by said battery when the generator is not supplying current to the train lines, and means for automatically starting and stopping said booster according as the current passing to said battery is greater or less than a certain amount and according as the current passing to said lamps from either the battery or the train wires is greater or less than a certain amount.

12. In a train lighting system, a generator normally supplying substantially constant voltage, train lines connected to said generator and extending throughout the train, lamps on the various cars of the train connected across said train lines, a battery equipment on a car of the train comprising a battery and a booster connected in series therewith connected across said train lines in parallel with the lamps, means for controlling the voltage of said booster to regulate the charging current passing to said battery from said train lines and to maintain substantially constant the voltage applied to said train lines by said battery when the generator is incapable of maintaining the voltage of the train lines at a certain value, and means for automatically starting and stopping said booster according as the current passing either from said train lines to said battery or vice versa is greater or less than a certain amount and according as the current taken by said translating devices is greater or less than a certain amount.

13. In a system of electrical distribution, a dynamo-electric machine, differentially wound field coils thereon, and a voltage regulator for controlling the energization of said field coils comprising a stationary current carrying coil, a fixed core of magnetic material mounted in the field thereof, a floating coil connected in series with said first named coil surrounding the end of said core and arranged for movement thereover, a movable contact member connected to said floating coil, an adjustable spring for biasing said contact member in a direction opposite to that in which the floating coil tends to move it, a fixed contact connected to one of said field coils and engaged by said movable contact member in one of its extreme positions of movement, and a second fixed contact connected to the other field coil and engaged by said movable contact member in its other extreme position of movement.

14. In a system of electrical distribution, a dynamo-electric machine, differentially wound field coils thereon by the suitable energization of which the voltage and polarity of the dynamo-electric machine may be controlled, and a magnetically operated switch device responsive to the voltage of the circuit to which the dynamo-electric machine is connected for controlling the current in each of said differential field coils.

In witness whereof, I have hereunto set my hand this 30th day of June, 1908.

WILLIAM E. VER PLANCK.

Witnesses:
  BENJAMIN B. HULL,
  HELEN ORFORD.